(No Model.)
J. C. POOL.
PLOW FENDER.
No. 413,290. Patented Oct. 22, 1889.
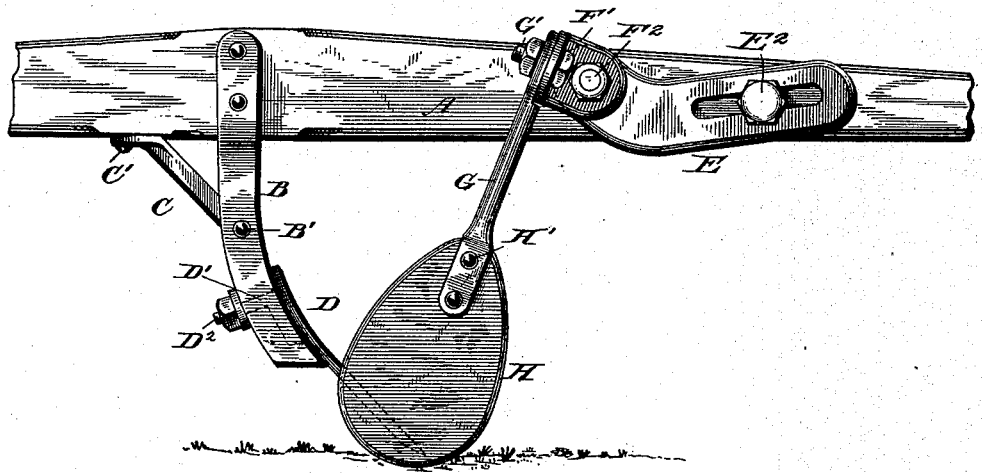
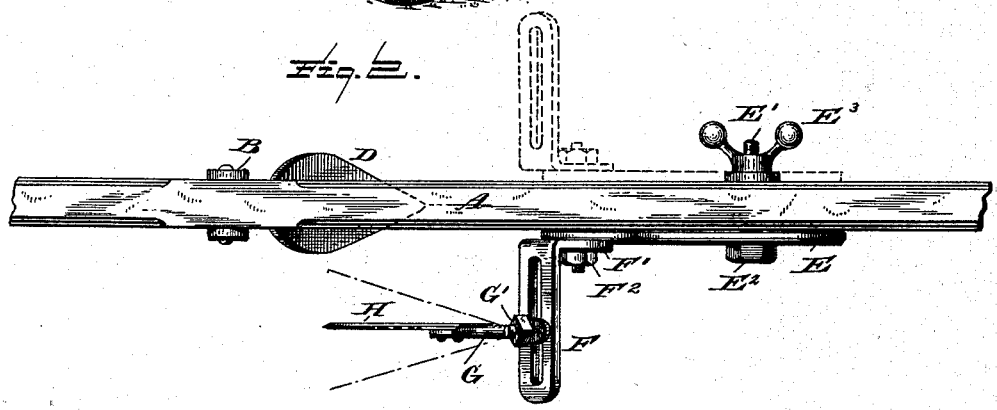
Witnesses
L. C. Hills.
H. Sutherland.
Inventor
J. C. Pool.
E. B. Stocking
Attorney.

UNITED STATES PATENT OFFICE.

JOHN C. POOL, OF BIG CREEK, GEORGIA.

PLOW-FENDER.

SPECIFICATION forming part of Letters Patent No. 413,290, dated October 22, 1889.

Application filed April 23, 1889. Serial No. 308,283. (No model.)

*To all whom it may concern:*

Be it known that I, JOHN C. POOL, a citizen of the United States, residing at Big Creek, in the county of Forsyth, State of Georgia, have invented certain new and useful Improvements in Plow-Fenders, of which the following is a specification, reference being had therein to the accompanying drawings.

This invention has relation to an improvement in fenders for plows, the main object being the provision of a fender which can be adjusted into many different positions, and one which will yield when uneven ground is being plowed.

Among the other objects of the invention is to provide a plow-fender consisting of as few parts as possible, being at the same time strong and serviceable and capable of manufacture at a minimum cost.

Referring to the drawings, Figure 1 is a side elevation of a portion of a plow provided with a fender and its connecting mechanism constructed in accordance with my invention, and Fig. 2 is a plan of the same.

Like letters refer to like parts in both figures of the drawings.

A represents the beam of any ordinary plow. Bolted or similarly attached to the beam A are the plow-shovel standards B, there being provided one on each side, being connected by a suitable tie bar or bolt B'.

C represents a strengthening-standard, a portion of the end being flattened and bolted or riveted to the beam, as at C', the opposite end thereof being secured in place by the bolt B', which connects the plow-shovel standards B.

The shovel or share D of the plow is shouldered, and is provided with the spindle D', (dotted lines, Fig. 1,) having screw-thread on its end to receive an ordinary nut $D^2$, or the same may be headed, as is desired.

E represents a link of suitable shape, preferably as shown. The link E is provided with a longitudinal slot, being held against the beam by means of the bolt E', having a nut or head $E^2$. The opposite end of the bolt E' is provided with the hand-wheel $E^3$ or other suitable adjusting device. Extending preferably at a right angle from and formed with a suitable base F' is a link F. The base F' is attached to the link E by means of a bolt and nut $F^2$, the same serving as a pivot for one of the adjustments of the fender. This link F is provided with a longitudinal slot running nearly its entire length.

G represents a rod or bar, which is flattened or sharpened at its ends. One end of the rod G is secured to the link F by means of a bolt G', provided with nuts on its ends.

H represents the fender proper, which is constructed of light steel or resilient material, and may be a wheel, if desired. I have here shown it ovoid-shaped. The fender proper is preferably riveted or bolted to the bar G, as at H'.

Suppose it be desired, where one fender and its mechanism is used, that the same be placed on the opposite side. The nuts on the bolt G' are first removed, and the bar or rod G placed on the opposite side in its desired position, and the nut on the bolt again secured in place. The link F is now removed from its position and reversed. After this operation it now remains to remove the bolt $E^2$, leaving the links E and F and their connecting mechanism disconnected from the beam A. The hand-wheel $E^3$, bolt E', and nut $E^2$ are then reversed, thus completing the operation.

What I claim is—

The combination, with a plow-beam, of a link adjustably attached to the beam, a second link pivotally attached near one end of the first-named link, and a fender-bar carrying at one end a fender and the other end adjustable to and from the beam on the free end of the last-mentioned link, substantially as specified.

In testimony whereof I affix my signature in presence of two witnesses.

JOHN C. POOL.

Witnesses:
JEHU M. STREETMAN,
ROSS A. BAGLEY.